(12) United States Patent
Crestol

(10) Patent No.: US 8,644,888 B2
(45) Date of Patent: Feb. 4, 2014

(54) WIRELESS HEADSET SWITCHING SYSTEM

(71) Applicant: Stealthwear, Inc., Valencia, CA (US)

(72) Inventor: Steven Crestol, Valencia, CA (US)

(73) Assignee: Stealthwear, Inc., Valencia, CA (US)

( * ) Notice: Subject to any disclaimer, the term of this patent is extended or adjusted under 35 U.S.C. 154(b) by 0 days.

(21) Appl. No.: 13/712,862

(22) Filed: Dec. 12, 2012

(65) Prior Publication Data

US 2013/0115882 A1    May 9, 2013

Related U.S. Application Data

(63) Continuation of application No. 13/483,989, filed on May 30, 2012, now Pat. No. 8,351,999, which is a continuation-in-part of application No. 13/326,107, filed on Dec. 14, 2011, now Pat. No. 8,340,729, which is a continuation of application No. 12/142,572, filed on Jun. 19, 2008, now Pat. No. 8,082,010.

(60) Provisional application No. 60/945,021, filed on Jun. 19, 2007.

(30) Foreign Application Priority Data

Jun. 19, 2008    (CA) ..................................... 2635395

(51) Int. Cl.
*H04B 1/38* (2006.01)
(52) U.S. Cl.
USPC ................... 455/569.1; 455/41.2; 455/575.2; 455/575.6; 455/556.1; 381/101; 381/328; 381/322; 381/330

(58) Field of Classification Search
USPC ............. 455/569.1, 41.2, 41.1, 575.2, 575.6, 455/556.1, 557, 90.3, 517, 518, 519, 521; 381/101, 328, 322, 330
See application file for complete search history.

(56) References Cited

U.S. PATENT DOCUMENTS

| | | | |
|---|---|---|---|
| 2005/0064915 A1* | 3/2005 | Lair | 455/569.1 |
| 2007/0042814 A1* | 2/2007 | Kakimoto et al. | 455/574 |
| 2007/0111796 A1 | 5/2007 | Giaimo, III et al. | |
| 2008/0118096 A1 | 5/2008 | De Pooter et al. | |
| 2008/0240440 A1 | 10/2008 | Rose et al. | |
| 2009/0230971 A1 | 9/2009 | Petrin et al. | |
| 2012/0065971 A1 | 3/2012 | Schrager | |
| 2012/0088461 A1 | 4/2012 | Crestol | |

* cited by examiner

*Primary Examiner* — Tuan Pham
(74) *Attorney, Agent, or Firm* — Steptoe & Johnson LLP

(57)    ABSTRACT

A wireless headset system including a switching unit having a detection circuit coupled to a wireless adapter. The detection circuit provides a first output signal to the wireless adapter upon detection of a triggering event, such as activation of a manual switch or detection of voltage of an audio output signal from a mobile communications device. The first output signal causes the wireless adapter to enter into an active audio channel mode. The detection circuit also provides a second output signal to the wireless adapter when no triggering event is detected, and the second output signal causes the wireless adapter to enter into a standby mode. Placing at least the wireless adapter in a standby mode saves battery life of the system.

3 Claims, 6 Drawing Sheets

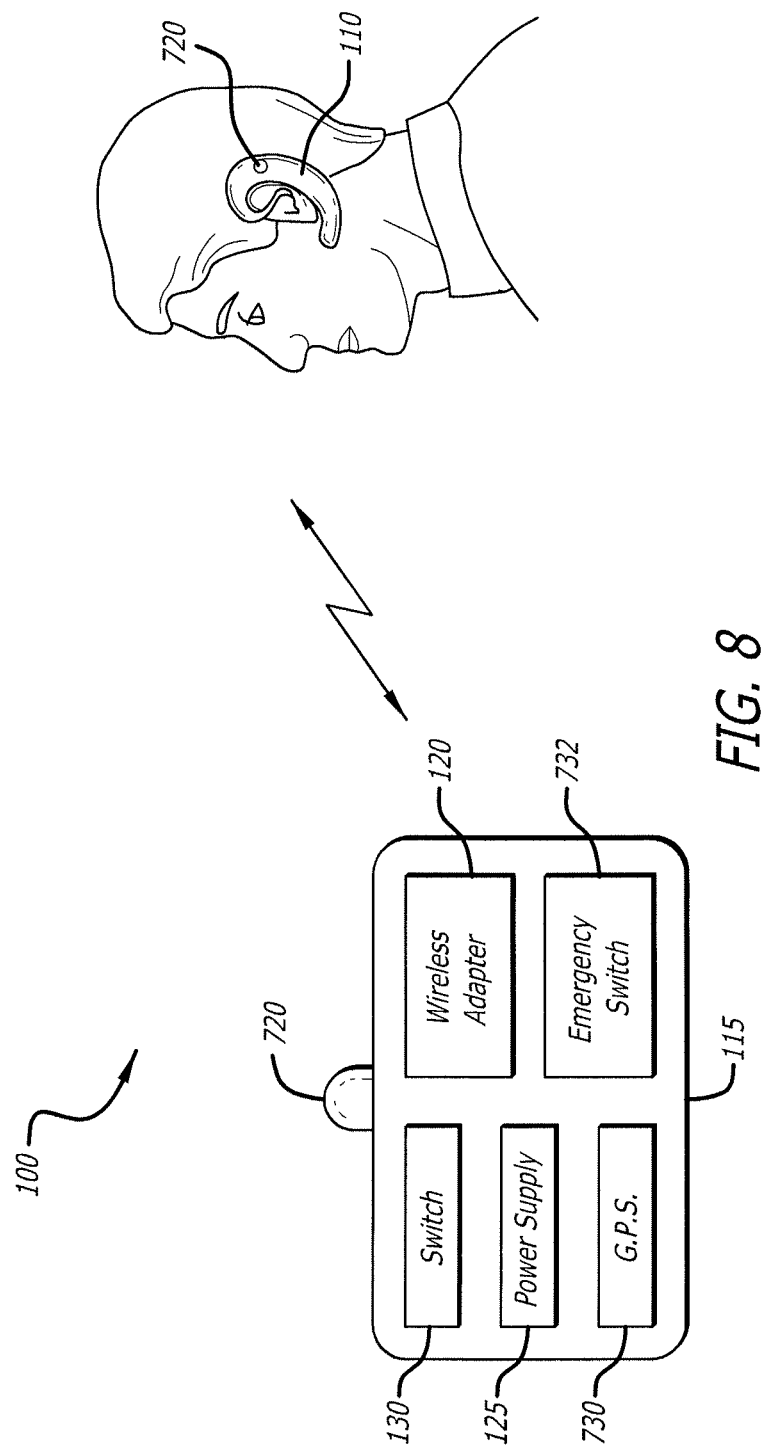

WIRELESS HEADSET SWITCHING SYSTEM

PRIORITY CLAIM AND RELATED APPLICATIONS

This application is a continuation of U.S. patent application Ser. No. 13/483,989, filed May 30, 2012, which is a continuation-in-part of U.S. patent application Ser. No. 13/326,107 filed Dec. 14, 2011, which is a continuation of U.S. patent application Ser. No. 12/142,572 filed Jun. 19, 2008, now U.S. Pat. No. 8,082,010, issued Dec. 20, 2011, which claims the benefit of U.S. Provisional Application No. 60/945,021 filed Jun. 19, 2007, the entire disclosure of which is incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

The disclosure relates generally to mobile communications systems and, more particularly, to a wireless headset switching system that can be coupled with a mobile communications device, including a device configured to operate in a push-to-talk mode.

The use of mobile communications devices in various forms and for various functions continues to expand rapidly. While new devices frequently offer new functionality, many continue to offer established functions that have proven invaluable to users. One such established function is the push-to-talk capability typically associated with handheld two-way radio transceivers, or commonly, "walkie talkies". While push-to-talk functionality was originally developed for military use, today it serves as a valuable communication feature in many other contexts, including industrial, commercial, public safety, and recreational applications. Push-to-talk functionality is characterized by half-duplex (or simplex) communication, in which only one device may transmit at a time, though multiple devices can receive the transmission. Typically a button or switch is used to enable a mobile communications device to transmit a communication when the button or switch is in a first position. When the button or switch is in a second position, the device is in a listen mode, in which it can only receive communications.

Traditionally, mobile communications devices have included one or more built-in speakers and microphones. Some devices also have been configured to support the connection and use of a wired external microphone, wired speaker headphone, or wired headset including one or more microphones and one or more speakers.

SUMMARY

A wireless headset switching system can be configured to enable the use of a wireless headset in conjunction with a mobile communications device. Further, the mobile communications device and switching system can be configured to implement a push-to-talk capability. The wireless headset can be used to capture audio information from and deliver audio information to a user. The wireless headset also can communicate with a wireless adapter that is coupled to the mobile communications device. In addition, the system can be configured to include a button or switch that can be actuated to enable the transmission of audio information from a microphone corresponding to the wireless headset through the mobile communications device. Further, the system also can be configured to allow the transmission of signals to the wireless headset only when the button is not pushed or the switch is not activated.

The wireless headset and the wireless adapter can communicate using a wireless transmission medium. For example, the wireless headset and wireless adapter can communicate using a short-range radio frequency protocol, such as Bluetooth®. In order to facilitate use with a mobile communications device, the present inventor recognized the need to couple the wireless adapter with a push-to-talk switch. The present inventor also recognized the need to house the wireless adapter and push-to-talk switch together in a single switching unit. The push-to-talk switch can be configured to control the flow of signals between the wireless adapter and the mobile communications device, such as through a mobile communications device connector. The inventor also recognized the need for one or more of the wired connections to the switching unit to be detachably coupled, such as through a plug connector.

In one embodiment, the subject matter can be implemented as a system comprising a mobile communications device, a wireless headset including a speaker and a microphone, and a switching unit comprising: a mobile communications device interface for transmitting signals to and receiving signals from the mobile communications device, a wireless adapter for transmitting signals to and receiving signals from the wireless headset, and a switch coupled to the mobile communications device interface and the wireless adapter, wherein the switch is configured to implement push-to-talk functionality by selectively connecting signals between the wireless adapter and the mobile communications device interface.

The subject matter also can be implemented such that the wireless headset and the wireless adapter use a short-range radio frequency protocol to communicate. Further, the subject matter can be implemented such that the short-range radio frequency protocol comprises the Bluetooth protocol. Additionally, the subject matter can be implemented to include at least one direct connection between the mobile communications device interface and the wireless adapter.

The subject matter also can be implemented such that the switch comprises a hand-held trigger switch. Further, the subject matter can be implemented such that the hand-held trigger switch is detachably coupled to the switching unit. The subject matter also can be implemented such that the switch is automatically switched to the first position in response to a signal level associated with the microphone that exceeds a predetermined threshold. Additionally, the subject matter can be implemented such that the switch is switched automatically to a second position in response to the signal level associated with the microphone dropping below the predetermined threshold for a predetermined period of time.

In another embodiment, the subject matter can be implemented as an apparatus comprising a mobile communications device interface for transmitting signals to and receiving signals from a mobile communications device, a wireless adapter for transmitting signals to and receiving signals from a wireless headset, a switch coupled to the mobile communications device interface and the wireless adapter, wherein the switch is configured to implement push-to-talk functionality by selectively connecting signals between the wireless adapter and the mobile communications device interface, and a trigger coupled to the switch for receiving input to select a position of the switch.

The subject matter also can be implemented such that the mobile communications device interface, the wireless adapter, and the switch are included in a common housing. Further, the subject matter can be implemented such that the switch and the trigger are housed in a hand-held trigger switch. Additionally, the subject matter can be implemented such that the wireless adapter is configured to communicate using a short-range radio frequency protocol.

Another embodiment may include setting a switch in a first position, connecting, through the switch, signals received from a mobile communications device to a wireless adapter for transmission to a wireless headset, and repositioning the switch, in response to input, to a second position, wherein signals received by the wireless adapter from the wireless headset are connected through the switch to the mobile communications device. Further, the subject matter can be implemented such that the input corresponds to a signal level associated with a microphone of the wireless headset. The subject matter also can be implemented to include repositioning the switch to the first position in response to the signal level associated with the microphone of the wireless headset dropping below a predetermined threshold. Additionally, the subject matter can be implemented to include transmitting signals from the wireless adapter to the wireless headset using a short-range radio frequency protocol.

In yet another embodiment, the wireless headset system may include a switching unit having a detection circuit coupled to the wireless adapter. In this embodiment, the detection circuit provides a first output signal to the wireless adapter upon detection of a triggering event. The first output signal causes the wireless adapter to enter into an active audio channel mode. The detection circuit can also provide a second output signal to the wireless adapter when no triggering event is detected, and the second output signal causes the wireless adapter to enter into a standby mode. Placing at least the wireless adapter in a standby mode saves battery life.

The switching unit may further include a switch coupled to the detection circuit, wherein the triggering event is a signal generated by actuating the switch to implement push-to-talk functionality by placing the wireless adapter into the active audio channel mode. In one embodiment, the switch is a hand-held trigger switch coupled to the switching unit. The detection circuit may include a first comparator integrated circuit used to compare the voltage of the signal generated by actuating the switch to a threshold value. If the voltage of the signal generated by actuating the switch is greater than the threshold value, then the detection circuit provides the first output signal to the wireless adapter.

In another embodiment, the detection circuit may be coupled to the wireless adapter and the mobile communications device interface. In this embodiment, the triggering event may be a signal created by audio output from the mobile communications device, and the detection circuit sends the first output signal to the wireless adapter when voltage of an audio output signal from the mobile communications device is received, which places the wireless adapter in the active audio channel mode. The detection circuit may include a comparator integrated circuit to compare the voltage of the signal created by audio output of the mobile communications device to a threshold value. If the voltage of the signal created by the audio output of the mobile communications device is greater than the threshold value, then the detection circuit provides the first output signal to the wireless adapter.

In yet another embodiment, the wireless headset system may include a wireless headset including an illuminator. The illuminator of the wireless headset may be an LED illumination and may illuminate upon successful connection between the wireless adapter and the wireless headset. In operation, the illuminator turns off after a set period of time or remains off after flashing. Still further, the system may have a switching unit that includes an illuminator. The illuminators of the wireless headset and switching unit may illuminate or flash upon successful connection between the wireless adapter and wireless headset. The illuminators of the wireless headset and switching unit turn off after a set period of time and/or after successful connection between the wireless adapter and wireless headset.

In still a further embodiment, the system may include a switching unit having a global positioning system connected to the wireless adapter for monitoring the location of the switching unit and for sending a distress signal including location data from the global positioning system. The global positioning system may be a differential global positioning system. In one embodiment, the global positioning system may be able to send a distress signal through the global positioning service provider and/or through the mobile communications device. The distress signal may include location data from the global positioning system. The distress signal may also include identification information of the user or of the switching unit. A user may be able to send the distress signal by actuating the switch a predetermined number of times in a set amount of time, such as three times within one second. The switching unit may also include a designated distress switch coupled to the global positioning system. Actuation of the distress switch sends the distress signal through the mobile communications device and/or through the global positioning system service provider.

The techniques described in this specification can be implemented to realize one or more of the following advantages. For example, the techniques can be implemented to permit use of a mobile communications device with a separate wireless headset. Further, the techniques can be implemented to permit the use of a button or switch that serves as a push-to-talk actuator and controls the transmission of signals between the wireless headset and the mobile communications device. The techniques also can be implemented to reduce the occurrence of tangling, breaking, and safety of the user associated with using a headset in conjunction with a mobile communications device. Further, the techniques can be implemented such that the switching unit is constantly powered and received communications thus can be connected without any delay, reducing the occurrence of audio defects, such as the loss of audio data. Additionally, the techniques can be implemented to permit coupling with a mobile communications device a wireless headset that also is capable of communicating with other devices, without having to modify a physical connection associated with either the wireless headset or the mobile communications device. Furthermore, the techniques can also be implanted to extend the battery life of the system.

The details of one or more implementations are set forth in the accompanying drawings and the description below. Other features and advantages will be apparent from the description and drawings, and from the claims.

BRIEF DESCRIPTION OF THE DRAWING

FIG. 8 discloses one embodiment of a communication system where a headset and a switching unit each include an LED illuminator.

DETAILED DESCRIPTION

The various embodiments described below are provided by way of illustration only and should not be construed to limit the claimed invention. Those skilled in the art will readily recognize various modifications and changes that may be made to the disclosed embodiments without departing from the scope of the claimed invention. By way of non-limiting example, it will be appreciated by those skilled in the art that particular features or characteristics described in reference to one figure or embodiment may be combined as suitable with features or characteristics described in another figure or embodiment. Further, those skilled in the art will recognize that the devices, systems, and methods disclosed herein are not limited to one field.

Figure 1:
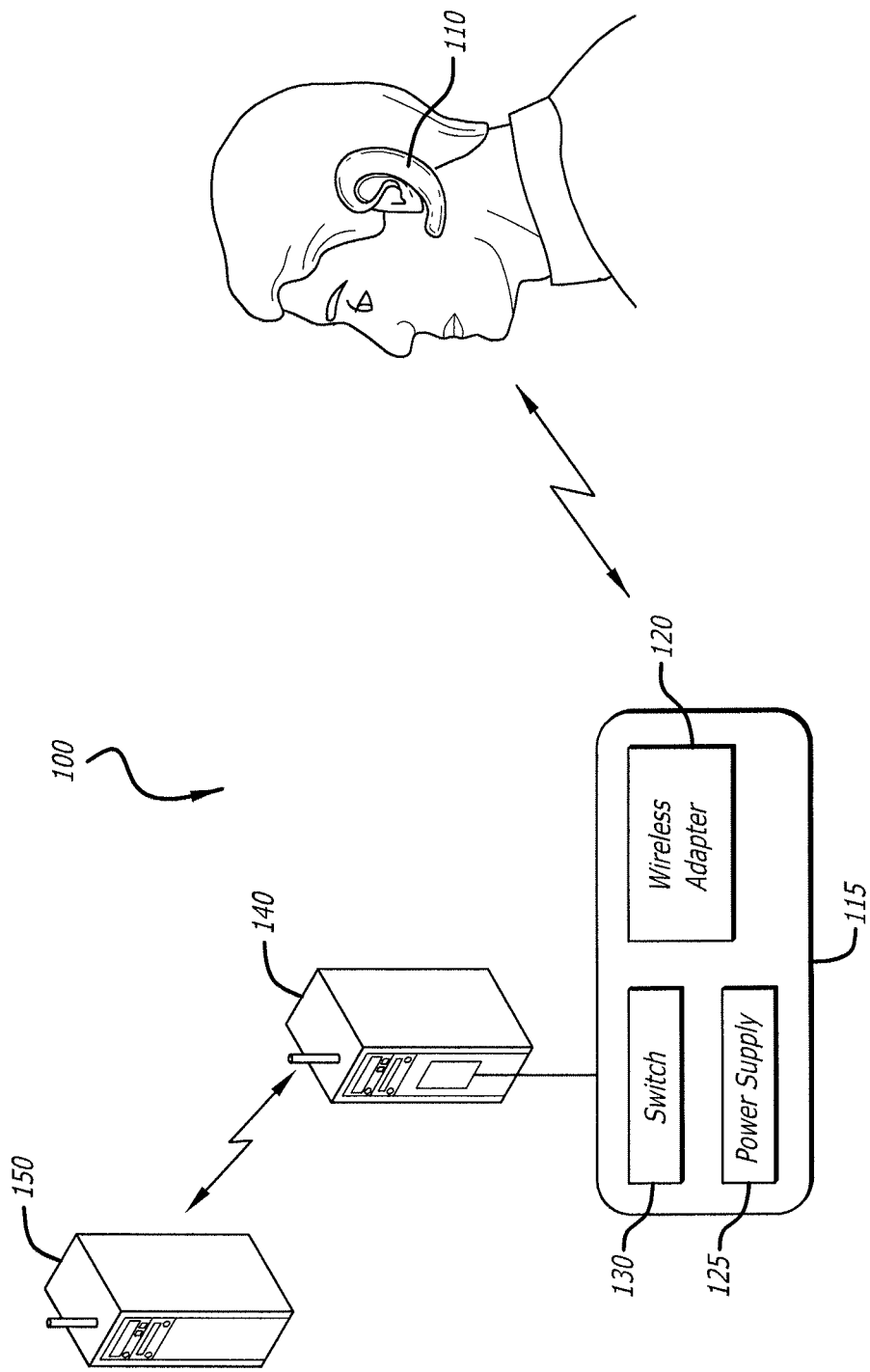
FIG. 1 shows an exemplary communication system.

Referring now to the drawings, wherein like reference numerals denote like or corresponding parts throughout the drawings, embodiments of a communication system are described and shown. FIG. 1 shows an exemplary communication system 100. The communication system 100 includes a wireless headset 110, which can be worn or carried by a user. The wireless headset 110 can include one or more microphones configured to capture audio information, such as verbal communication of the user. The wireless headset 110 also can include one or more speakers to output audio information to the user. In an implementation, the wireless headset 110 further can include analog and/or digital electronics configured to enhance the signals associated with the one or more speakers and/or microphones, such as amplification, filtering, and noise reduction/cancellation.

The wireless headset 110 also can include a power supply (not shown), which can be configured to provide power to one or more components included in the wireless headset 110. For example, the power supply can include one or more rechargeable batteries. In some implementations, during operation of the wireless headset 110, the power supply provides continuous power sufficient to maintain each of the components in an operable state. Thus, signals can be transmitted and received by the wireless headset 110 without any delay or "wake-up" period.

Further, the wireless headset 110 can include a wireless interface for communicating with a wireless adapter 120, such as a transmitter and a receiver. The wireless interface included in the wireless headset 110 can be configured to operate using any wireless transmission medium, including radio frequency and infrared signals. For example, the wireless headset 110 can be configured to transmit and receive signals in the frequency range of 2.4 GHz to 2.48 GHz. The wireless headset 110 further can employ a frequency hopping algorithm. Alternatively, other frequency ranges can be used. Additionally, the wireless headset 110 can be configured to communicate using any communication protocol. In an implementation, the wireless headset 110 can use a short-range radio frequency communication protocol, such as Bluetooth or a proprietary protocol.

Similarly, the wireless adapter 120 can include a wireless interface for communicating with the wireless headset 110, such as a transceiver or a transmitter and a receiver. The wireless adapter 120 also can include a wired interface for communicating with a switch 130. Thus, the wireless adapter 120 can be configured to convey signals received from the wireless headset 110 to the switch 130 and to convey signals received from the switch 130 to the wireless headset 110. The wireless interface of the wireless adapter 120 also can be configured to operate using any wireless transmission medium, including radio frequency and infrared signals. For example, the wireless adapter 120 can be configured to transmit and receive signals in the frequency range of 2.4 GHz to 2.48 GHz. The wireless adapter 120 also can be configured to communicate using any communication protocol, including a short-range radio frequency communication protocol, such as Bluetooth. Further, the wireless adapter 120 can be configured such that it is compatible and interoperable with the wireless headset 110. Additionally, the wireless adapter 120 and the switch 130 can be housed together in a switching unit 115. In another implementation, the wireless adapter 120 and the switch 130 can be contained in separate housings.

The switch 130 also can be coupled to a mobile communications device 140, such as a mobile or portable two-way radio device (or "walkie-talkie"), through an additional wired interface. Thus, signals received by the mobile communications device 140 can be transmitted to the wireless headset 110 and output to a user. For example, the signals can be output to a user through the one or more speakers included in the wireless headset 110. Further, signals received by the wireless headset 110, such as verbal communication by a user received by one or more microphones, can be transmitted to the mobile communications device 140. Additionally, the mobile communications device 140 can be configured to communicate with one or more other mobile communications devices 150, such as through radio frequency transmissions.

Additionally, the switching unit 115 can include a power supply 125, which can be configured to provide power to one or more components, such as the wireless adapter 120. For example, the power supply 125 can include one or more rechargeable or non-rechargeable batteries. In some implementations, during operation of the switching unit 115, the power supply 125 provides continuous power sufficient to maintain each of the components in an operable state. Thus, received signals can be connected through the switching unit 115 without any delay or "wake-up" period.

Figure 2A:
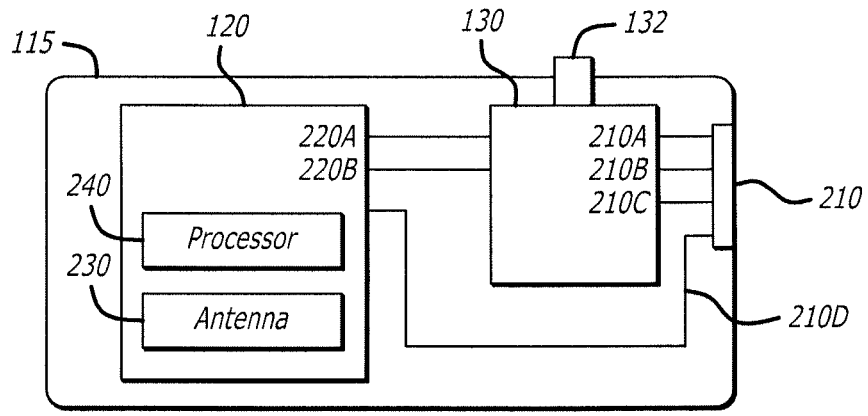
FIGS. 2A-2C show exemplary switching units including wireless adapters and switches.

FIG. 2A shows an exemplary wireless adapter 120 and a switch 130 housed in a switching unit 115. The switching unit 115 can be configured to include a down lead 210 that is connected to an external cable. In other implementations, the external cable can be removably (or detachably) coupled to the switching unit 115, such as through a plug-and-jack connection. The down lead 210 can transmit signals to and from the switching unit 115. One or more wires can be connected to the down lead 210 to form an electrical connection with one or more components in the switching unit 115, including the wireless adapter 120 and the switch 130. For example, the down lead 210 can include wires 210A, 210B, and 210C, which can be connected to the switch 130. Further, the down lead 210 can include the wire 210D, which can be connected directly to the wireless adapter 120.

The wires connected to the down lead 210 can correspond to electrical connections associated with one or more external devices. For example, the wires connected to the down lead 210 can correspond to one or more microphones and speakers associated with an external communication device, such as a mobile communications device. Further, the wires connected to the down lead 210 can be used to route signals transmitted and received by the one or more external devices. A trigger 132 can be used to select the position of the switch 130.

The wireless adapter 120 also can include a wired interface to which one or more wires are coupled. For example, the wireless adapter 120 can include wires 220A and 220B, which couple the wireless adapter 120 to the switch 130. The wireless adapter 120 further can include a direct connection to the down lead 210, such as the wire 210D. Additionally, the wireless adapter 120 can include one or more components, such as an antenna 230 and a processor 240. The processor 240 can be a general purpose processor or a specialized processor adapted to facilitate communication over a particular protocol, such as Bluetooth. Further, the antenna 230 can be configured to transmit signals to and receive signals from a corresponding device, such as the wireless headset 110.

Figure 2B:
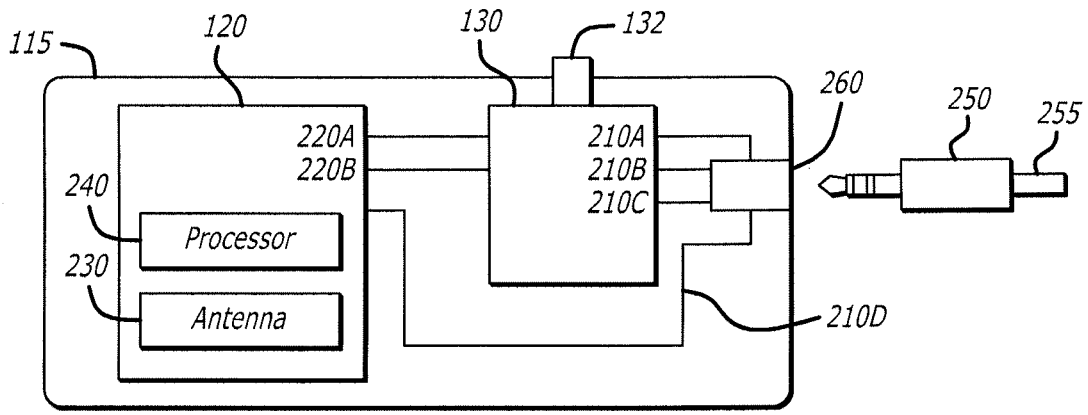

FIG. 2B also shows an exemplary wireless adapter 120 and a switch 130 housed in a switching unit 115. The switching unit 115 can be configured such that a wired connection to an external communication device is formed using a plug-and-jack connection. A plug 250 can be connected to an end of a cable 255 that is to be coupled to the switching unit 115. The plug 250 can have one or more prongs of any size, and each prong further can have one or more contacts. Further, the contacts can correspond to speaker and/or microphone connections associated with the external communication device. Additionally, the plug 250 can be detachably coupled with a jack 260 included in the switching unit 115. The jack 260 can include one or more contacts corresponding to the contacts of the plug 250. Further, one or more wires connected to the switch 130 and the wireless adapter 120 also can be coupled to contacts associated with the jack 260.

Figure 2C:
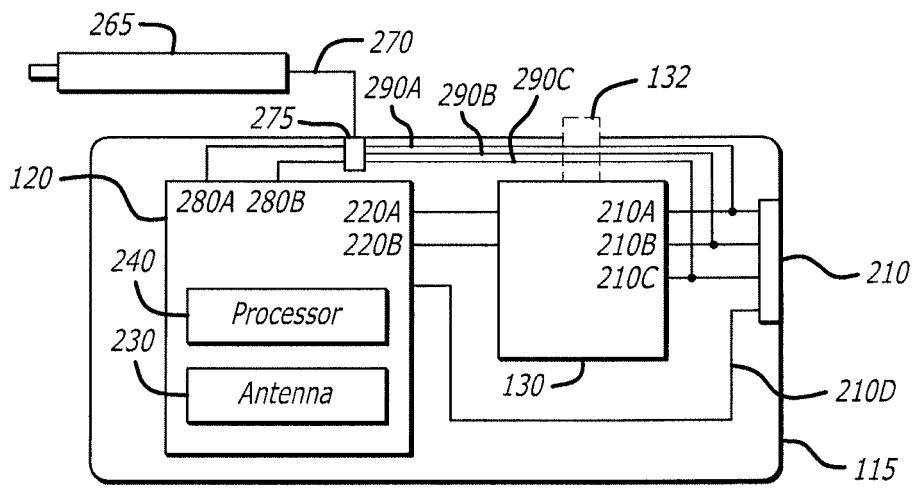

FIG. 2C also shows an exemplary wireless adapter 120 and a switch 130 housed in a switching unit 115. Additionally, a hand-held trigger switch 265 can be coupled to the switching unit 115. In some implementations, coupling the hand-held trigger switch 265 to the switching unit can disable the switch 130. Alternatively, both the switch 130 and the hand-held trigger switch 265 can be operable simultaneously, such that either can be used to switch signals between the wireless adapter 120 and the mobile communications device 140.

The hand-held trigger switch 265 can be coupled to the switching unit 115 through a cable 270, which can be fixedly or detachably coupled to a corresponding trigger interface 275. For example, the cable 270 can include a plug connector and the trigger interface 275 can include a jack configured to receive the plug connector. Further, the cable 270 can include one or more wires, connected through the trigger interface 275, which operably couple the hand-held trigger switch 265 to the components of the switching unit 115. For example, the wires 290A, 290B, and 290C can connect the trigger interface 275 with the down lead 210. Additionally, the trigger interface 275 can be coupled to the wireless adapter 120 through the wires 280A and 280B.

Figure 3:
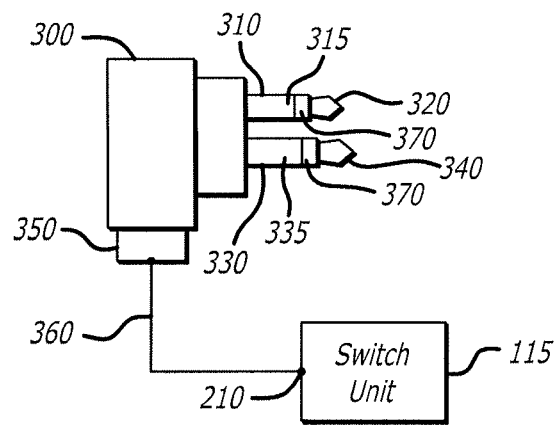
FIG. 3 shows an exemplary mobile communications device connector.

FIG. 3 shows an exemplary mobile communications device connector 300 coupled to the switch unit 115. The mobile communications device connector 300 can be configured as a dual-plug connector. In some implementations, a different plug configuration can be used based on the signals to be transmitted and/or the interface of the mobile communications device. For example, a plug connector such as a TRS connector also can be used. Further, the mobile communications device connector 300 can be coupled to the switching unit 115 by a cable 360 that includes one or more wires, such as at the down lead 210. In some implementations, the cable 360 also can include a plug connector that can be detachably coupled to the switch unit 115.

The mobile communications device connector 300 can include a plug body 350, a first plug 310, and a second plug 330. The first plug 310 and the second plug 330 can be of equal or different sizes. The first plug 310 can include a sleeve 315 and a tip 320, which are electrically conductive. Further, the first plug 310 can include one or more portions that correspond to signals received and/or generated by a particular system component, such as a microphone or a speaker. For example, the sleeve 315 of the first plug 310 can correspond to an electrically negative microphone connection and the tip 320 can correspond to an electrically positive microphone connection.

Similarly, the second plug 330 can include a sleeve 335 and a tip 340, which also are electrically conductive. The second plug 330 also can include one or more portions that correspond to signals received and/or generated by a particular system component, such as a microphone or a speaker. For example, the sleeve 335 of the second plug 330 can correspond to an electrically negative headphone connection and the tip 340 can correspond to an electrically positive headphone connection. Additionally, the first plug 310 and the second plug 330 can include one or more insulating rings 370 to separate electrically conductive portions.

Figure 4:
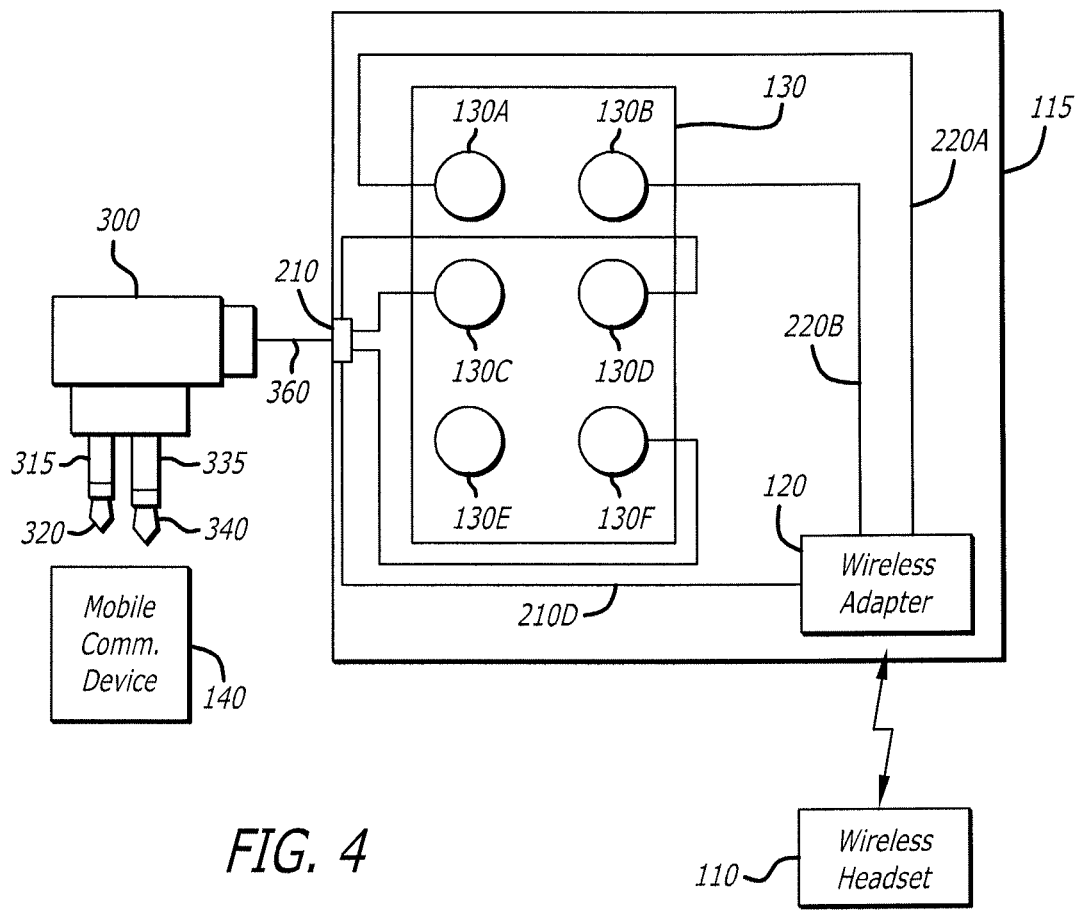
FIG. 4 shows an exemplary switch and interconnections between a wireless adapter and a mobile communications device.

FIG. 4 shows an exemplary switch and interconnections between a wireless adapter and a mobile communications device. The switch 130 can be any switch known in the art through which the disclosed connections can be achieved. In some implementations, the switch 130 can be configured using a double pole, double throw ("DPDT") switch. In some other implementations, the hand-held trigger switch 265 can be used in addition to or in place of the switch 130.

The switch 130 includes a plurality of connections, including connections 130A, 130B, 130C, 130D, 130E, and 130F. A wire associated with a component or device, such as the wireless adapter 120, can be connected to the switch 130. The connection between the wire and the switch 130 can be non-detachable, such as a soldered or clamped connection that is intended to be permanent. In another implementation, the connection with the switch can be implemented through a detachable connector, such as a plug or jack connector that contacts an electrically conductive portion of the switch. In such an implementation, the connection with the switch can be broken by extracting the connector.

To couple the wireless adapter 120 and the mobile communications device 140, one or more connections associated with the wireless adapter 120 and the mobile communications device connector 300 can be electrically coupled through the switch 130. For example, the wire 220A associated with the wireless adapter 120 can be coupled with a first connection 130A corresponding to a first common connection. The wire 220B associated with the wireless adapter 120 further can be connected to a second connection 130B, which corresponds to the second common connection of the switch 130. The common connections 130A and 130B are connections that are commonly shared by each switch position.

Similarly, the tip 320 of the first plug 310 included in the mobile communications device connector 300 can be connected through the down lead 210 to the third connection 130C of the switch 130, which corresponds to a first normally open connection. Further, the sleeve 315 of the first plug 310 can be connected through the down lead 210 to the fourth connection 130D, which corresponds to the second normally open connection.

The normally open connections 130C and 130D are typically open and unconnected in the switch 130. Thus, when the switch 130 is in a first position, the microphone connections 315 and 320 corresponding to the mobile communications device 140 are electrically uncoupled. When the switch 130 is moved to a second position, however, the microphone connections 315 and 320 corresponding to the mobile communications device 140 are electrically coupled to the microphone and common connections of the wireless adapter 120. Thus, signals generated by the one or more microphones associated with the wireless headset 110 can be transmitted to the mobile communications device 140 through the switch 130.

Further, the sleeve 335 of the second plug 330 included in the mobile communications device connector 300 can be connected to the sixth connection 130F of the switch 130, which corresponds to a normally closed connection. Thus, when the switch 130 is in the first position, the negative headphone connection of the sleeve 335 is electrically coupled to a common connection of the wireless adapter 120. Additionally, the tip 340 of the second plug 330 can be directly coupled to a headphone connection, such as the wire 210D, of the wireless adapter 120 through the switch 130.

Thus, when the switch 130 is in the first position, corresponding to the normally closed connections, signals generated by the mobile communications device 140 that are to be output by a speaker can be transmitted to the wireless headset 110 through the switch 130 and the wireless adapter 120. Alternatively, the switch 130 can be moved to the second position, prior to a user speaking, to permit the signals captured by the one or more microphones included in the wireless headset 110 to be transmitted through the wireless adapter 120 and the switch 130 to the mobile communications device 140a A user can selectively actuate the switch 130 to control transmitting and receiving through the mobile communications device 140.

In an implementation, the switch 130 can be configured to be automatically actuated. Thus, the switch 130 can select the second position when a signal level associated with a microphone connection 220A of the wireless adapter 120 exceeds a predetermined threshold. For example, the threshold can correspond to a signal level associated with speech by a wireless headset 110 user. In some implementations, audio level detection circuitry can be configured to generate a trigger signal when the signal level associated with a microphone of the wireless headset 110 exceeds a predetermined threshold. The trigger signal further can cause the switch 130 to be positioned in the second position.

Further, the switch 130 can be configured to select the first position once the signal level associated with the microphone connection 220A of the wireless adapter 120 drops below a predetermined threshold, such as for a predetermined period of time. Additionally, in some implementations, the audio level detection circuitry can be configured to generate another trigger signal when the signal level associated with a microphone of the wireless headset 110 falls below a predetermined threshold. The communication system 100 also can be configured such that the default position of switch 130 is the first position. In another implementation, the default position of the switch 130 or the connections to the switch 130 can be reversed.

Figure 5:
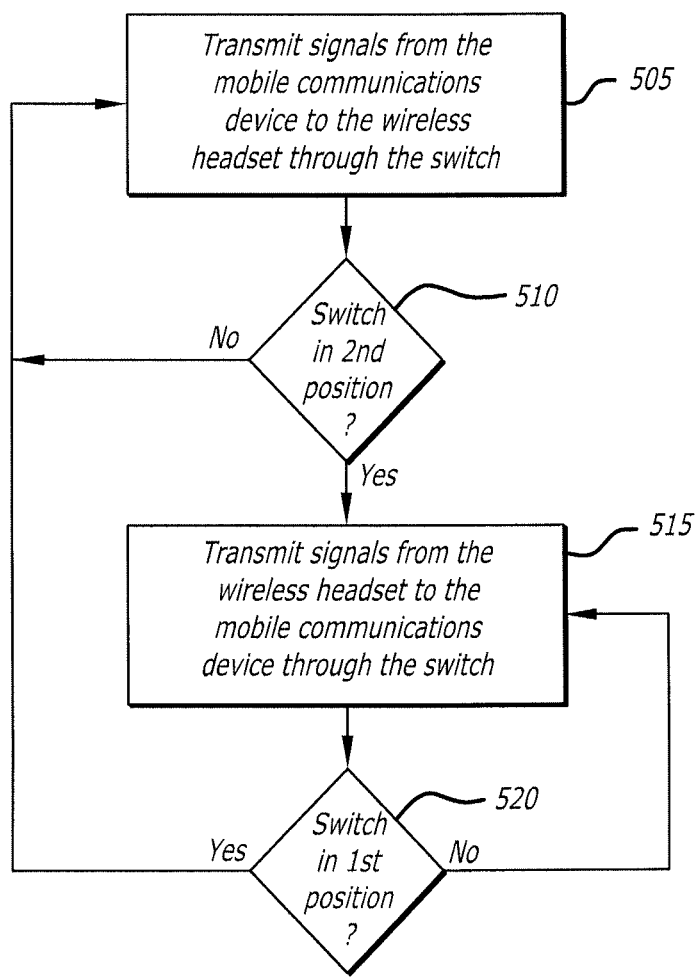
FIG. 5 discloses an exemplary method of implementing push-to-talk functionality using a switch.

FIG. 5 discloses a method of implementing push-to-talk functionality using the switch 130 in the communication system 100. Signals are transmitted from the mobile communications device 140 to the wireless headset 110 through the switch 130 and the wireless adapter 120 when the switch 130 is in the first position (505). For example, a user of the wireless headset 110 can maintain the switch 130 in the first position to hear communications received by the mobile communications device 140. While the switch 130 is in the first position (510), signals received by the mobile communications device 140 are routed to the wireless headset 110 and can be output through one or more speakers (505). The signals received by the mobile communications device 140 are routed through the circuitry of the switching unit 115, including an interface to the mobile communications device 140, such as the down lead 210. In another implementation, the function of the switch 130, including the flow of signals, can be reversed.

If the switch 130 is moved to the second position (510), signals are transmitted from the wireless headset 110 to the mobile communications device 140 through the switch 130 and the wireless adapter 120 (515). Thus, the switch 130 can be used to implement push-to-talk functionality. For example, a user of the wireless headset 110 can actuate the switch 130, causing the switch 130 to move to the second position in order to transmit communications through the mobile communications device 140. In some implementations, the switch 130 can be actuated using a trigger included in the switching unit 115. In other implementations, a hand-held trigger switch can be coupled to the switching unit 115 to perform the switching. In still other implementations, the switch 130 can be automatically actuated in accordance with a signal level associated with a microphone included in the wireless headset 110.

As long as the switch 130 is in the second position (520), signals received by the wireless headset 110 are transmitted to the mobile communications device 140, such as for transmission (515). If, however, the switch 130 is returned to the first position (520), signals are then transmitted from the mobile communications device 140 to the wireless headset 110 through the switch 130 and the wireless adapter (505).

Figure 6:
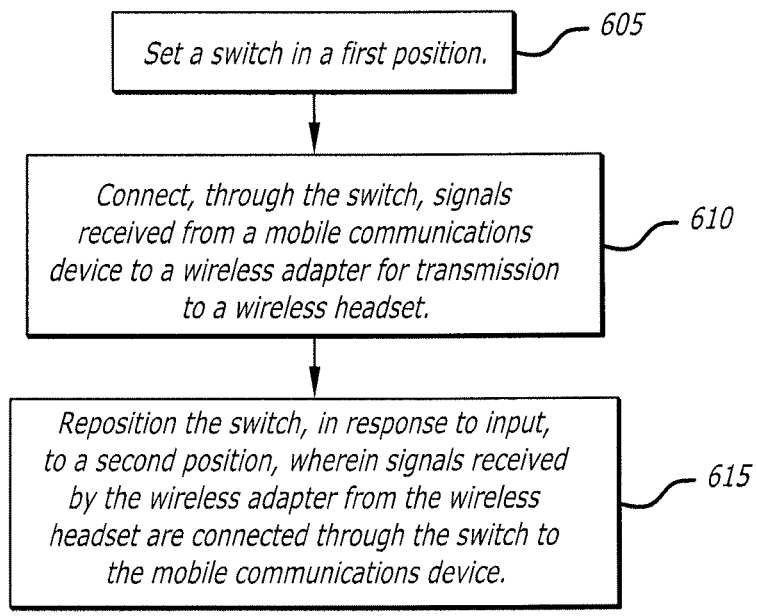
FIG. 6 discloses an exemplary method of switching signals.

FIG. 6 discloses an exemplary method of switching signals. Initially, a switch can be set in a first position (605). The switch, e.g., can be set to a default position in which the normally closed connections are connected. Further, signals received from a mobile communications device can be connected through the switch to a wireless adapter for transmission to a wireless headset (610). Additionally, the switch can be repositioned, in response to input, to a second position, wherein signals received by the wireless adapter from the wireless headset are connected through the switch to the mobile communications device (615). For example, audio data captured by a microphone included in the wireless headset can be received by the wireless adapter and transmitted through the switch to a mobile communications device interface.

In one embodiment, the communication system, including the wireless headset 110, the switching unit 115, and/or the mobile communications device 140 (such as a two-way radio) enter a standby or sleep mode using little power when there is no voltage of an audio output signal detected by a detection circuit 700. The standby mode saves or extends battery life of one or more of these devices. In this embodiment, upon activating a push-to-talk switch (the switch 132 or hand-held trigger switch 265) or detection of voltage of the audio output signal from the communications device, the system "wakes-up" and quickly changes to audio transmit and receive mode so there is no delay in voice communication.

Figure 7:
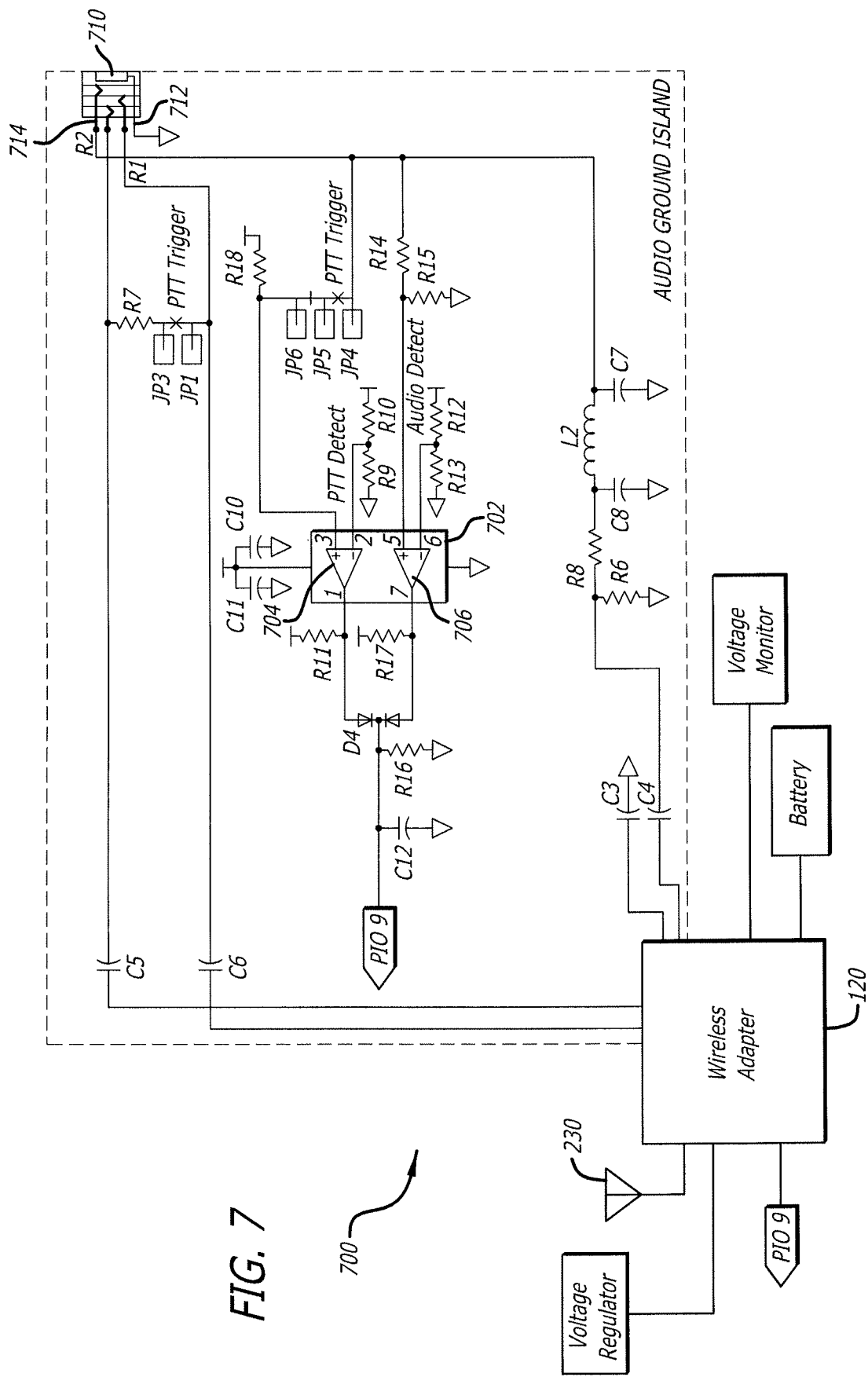
FIG. 7 discloses a schematic diagram of a detection circuit capable of allowing the communication system to enter standby mode and resume normal operation upon activation of the push-to-talk switch or detection of voltage of a signal created by audio output from a communication device.

FIG. 7 discloses a schematic of the detection circuit 700 capable of allowing the communication system to enter standby mode and resume normal operation upon activation of a triggering event, such as actuating the push-to-talk switch (the switch 132 or hand-held trigger switch 265) or automatic detection of voltage of the audio output signal from the communications device 140 (two-way radio). The detection circuit 700 is disposed on the circuit board of the switching unit 115. The detection circuit 700 includes a comparator circuit 702 having a first comparator integrated circuit 704 and a second comparator integrated circuit 706. The first comparator integrated circuit 704 detects the position of a push-to-talk switch, such as the switch 132 or hand-held switch 265, and the second comparator integrated circuit 706 detects an audio voltage level from the communications device 140 (two-way radio). By way of example only, and not by way of limitation, the first and second comparators 704 and 706 are coupled through a logical 'OR' gate into a voltage integrator circuit, and connected to an input terminal on a processor of the wireless adapter 120, such as a BlueTooth module, for the purposes of minimizing quiescent power consumption during 'off' audio periods so as to greatly extend the useable battery charge life.

In one embodiment, the communication system includes firmware or software that acts upon the presents of a 'High' or 'Low' voltage level from the output of an 'OR' gate and initiates a standby or sleep mode (low power mode) or an active audio channel mode (normal operation) of the communication system. When voltage level is 'Low', the firmware switches at least the wireless adapter 120 into standby mode. When voltage level is 'High', the firmware switches at least the wireless adapter 120 into active audio channel mode. The firmware may also control the mode of operation of the wireless headset and mobile communications device. In addition, the firmware of the wireless headset system may provide for a dwell time to make smooth audio channel transitions when entering into standby mode. In one embodiment, the firmware or software is stored in a memory associated with the processor of the wireless adapter. In another embodiment, the firmware is stored in a memory associated with a separate processor that is in communication with the wireless adapter.

The communication system enters standby mode to save battery life, and may enter active audio channel mode when the switch 132 or hand-held switch 265 is activated. The first comparator integrated circuit 704 includes Pin 3 (+input). Pin 3 is the push-to-talk detect input that is connected through a push-to-talk switch 'Brake' contact to ground. The first comparator integrated circuit 704 also includes Pin 2 (−input). Pin 2 provides a reference or threshold voltage that can be compared with the voltage detected at Pin 3. When the communication system is in standby mode, the voltage at Pin 3 is less than the reference voltage at Pin 2, which forces Pin 1 (output) to be 'Low' or near 0 volts ("V"). In one embodiment, Pin 2 is connected to a resistor voltage divider between Vcc (3.3-V) and ground establishing a bias voltage of about 1.65 V, which is (Vcc/2). This voltage of about 1.65 V is used to compare with the voltage level present at Pin 3. It has been contemplated that the reference or threshold voltage at Pin 2 can be higher or lower than 1.65 V depending on the type of equipment used with the system, including the type of communications device (radio).

During operation of communication system, when a user actuates the switch 132 or hand-held switch 265, the 'Brake' contact connected to ground 'opens' and removes ground from Pin 3. When ground is removed from Pin 3, the voltage on Pin 3 (+input) becomes greater than the voltage on Pin 2 (−input), causing the output at Pin 1 to go 'High', which passes through the 'OR' gate D4. Capacitor C12, an integrator circuit, charges when Pin 1 is 'High', and charging the capacitor C12 causes pin input output ("PIO") 9, which is connected to the wireless adapter, to go 'High'. The wireless adapter 120 enters active audio channel mode when PIO 9 is 'High'. In the embodiment shown in FIG. 7, Pin 3 is connected to Vcc, which may be about 3.3 V, through a resistor R18 that limits current flow to Uamps. Therefore, when the switch 132 or 265 is actuated and ground is removed from Pin 3, the voltage on Pin 3 becomes greater than the voltage on Pin 2 (−input), causing Pin 1 to go 'High' or about 3.3 V. It has been contemplated that Vcc may be higher or lower than 3.3 V depending on the type of equipment used with the system.

By way of example only, the switch 132 or hand-held switch 265 is a double pole double throw (DPDT) switch which has two 'Make' and two 'Brake' sets of contacts that are actuated when the user pushes the switch. In one embodiment, the switch 132 or 265 includes five connections to the printed circuit board where the first comparator circuit 704 is located.

In one embodiment, the communication system will hold the audio channel in active or operation mode for two to thirty seconds after PIO 9 transitions from 'High' to 'Low', thus the audio channel remains active for two to thirty seconds after the switch 132 or 265 is released. It has also been contemplated that the audio channel may stay in operation mode for any amount of time including from one second to two minutes or greater. Audio feedback from the communication device also may keep the system in active audio channel mode as described below. Once radio communication is silent, then the communication system may enter the standby mode after a period of time.

When the communication system is in standby mode, detection of the voltage from the audio output signal of the communications device 140 can automatically place the wireless headset system into active audio channel mode. As shown in FIG. 7, the second comparator integrated circuit 706 includes Pin 5 (+input), which is an audio detect input that is connected to a cable from the communications device 140, such as an associated 2-way Motorola radio or equivalent radio. The second comparator integrated circuit 706 also includes Pin 6 (−input), which provides a reference or threshold voltage to be compared with the voltage of Pin 5. When the voltage at Pin 5 is greater than the voltage at Pin 6, Pin 7 (output) of the second comparator 706 is 'High'. Consequently, when the voltage at Pin 5 is less than the voltage at Pin 6, Pin 7 (output) is 'Low' or about 0 V. In one embodiment, Pin 6 is connected to a resistor voltage divider between Vcc, which is about 3.3 V, and ground establishing a bias voltage of about 0.047 V for Pin 6. It has been contemplated that Vcc may vary higher or lower from 3.3 V depending on the type of equipment used with the system. The reference voltage of Pin 6 may also vary depending on the type of equipment used. In this embodiment, when the voltage at Pin 5 is greater than the voltage at Pin 6, Pin 7 is about 3.3 V, and when the voltage at Pin 5 is less than the voltage at Pin 6, Pin 7 is about 0.0 V. However, the 'High' voltage value for Pin 7 may vary in other embodiments.

In operation, when no audio signal is detected at Pin 5 (+input), Pin 7 (output) of the second comparator 706 is 'Low', or about 0.0 V. This output passes through 'OR' gate D4 and PIO 9, which is the input on the wireless adapter 120 controlling standby mode. Firmware stored in memory associated with the wireless adapter 120 keeps the switching unit, including the wireless adapter, in standby mode while PIO 9 is 'Low'. The firmware also can control the mode of operation (standby mode or normal operation mode) of the other devices in the communication system, including the wireless headset. When voltage of an audio signal is detected and the voltage at Pin 5 exceeds the bias level at Pin 6, Pin 7 is forced to go 'High' and charges capacitor C12. Charging capacitor C12 causes PIO 9 to go 'High' and allows the firmware on the wireless adapter 120 to establish an active audio channel mode connection (high power operation) of the communication system. In this mode of operation, the wireless adapter 120, wireless headset 110, mobile communication device 140, or any combination of these devices, enter high power operation.

In one embodiment, audio being received from the communications device 140 is detected by detection circuit 700 in the following manner. The communication device 140 is connected to detection circuit 700 through connector 710, and audio output of the communication device is connected via a first pin (ground) 712 and a second pin 714 of connector 710. The second pin 714 of the connector is connected to the audio detect Pin 5 through resistor R14. In one embodiment, resistor R14 is 47K, however, other types of resistors having different values may also be used depending on the type of communications device (radio) used in with the system. The audio output from the communications device is adjustable via a volume control and has a range of about 0.3 V to about 7.2 V. When voltage of the audio output from the communications device 140 is detected, resistor R15 is removed from Pin 5 (+output) and the audio voltage output travels through resistor R14 to the audio detect Pin 5. Once the voltage at Pin 5 increases and becomes greater than the voltage bias level at Pin 6, Pin 7 goes 'High' causing PIO 9 to go 'High' as described above. This, in turn, causes the wireless adapter 120 to establish an active audio channel mode.

The firmware of the wireless adapter 120 will remain in the active audio channel mode for about two seconds to about thirty seconds after PIO 9 transitions from 'High' to 'Low'. Thus, the audio channel remains active for two to thirty seconds to help smooth out choppy audio input found in normal speech patterns. It has also been contemplated that the wireless adapter 120 may remain in the active audio channel mode for about 1 second to about two minutes or longer.

In one embodiment, the wireless headset 110 and/or the switching unit 115 may include an illuminator 720, such as an LED, as shown in FIG. 8. The color of the LED light on the wireless headset or switching unit may be red, blue, green, white, yellow or any other color that is desired. In other embodiments, only one of the wireless headset or the switching unit includes an illuminator or neither device includes an illuminator. The system may be configured such that illuminators 720 are turned on or flash a set number of times (one or more) when the system is powered on. Also, the illuminators may be turned on during a sync mode when the wireless adaptor 120 is synced with the wireless headset. When the illuminators are turned on, each may blink, flash, or be illuminated constantly. In one embodiment, the illuminators 720 turn off on both the headset and switching unit after successful connection between both units. The illuminators 720 may turn off after a specified amount of time. It has been contemplated that only one of the LED illuminators will turn off after a successful connection between the units, however, it is preferred that both illuminators turn off so that visible detection of the communication system is less likely. The illuminators will not turn on or flash on either the wireless headset 110 or the switching unit if the battery is low or the connection is lost during operation. This is to protect the user from being noticed from the blinking illuminator. In one embodiment, if connection is lost between the wireless headset 110 and the switching unit 115, an audible tone or chime can be emitted from the speaker in the wireless headset to alert the user. Furthermore, an audible tone or chime can be emitted by the wireless headset to alert the user that the battery power is running low.

In yet another embodiment, the communication system may include a Global Positioning System ("G.P.S.) or Differential Global Positioning System ("D.G.P.S.") 730. The G.P.S./D.G.P.S. 730 may be incorporated in the switching unit 115 or in a separate device that communicates with the switching unit. In one embodiment the G.P.S./D.G.P.S. 730 will be in communication with the wireless adapter. The G.P.S./D.G.P.S. 730 can be used to monitor the location of the switching unit and/or the location of user of the communication system for their safety. In an emergency situation, the user may depress the trigger 132 or the hand-held trigger switch 265 a selected amount of times that will instruct the G.P.S./D.G.P.S. 730 to send a distress signal to the user's monitoring station or headquarters. The monitoring station may be any type of computer station such as a mobile command unit, portable device, laptop, or smartphone. This distress signal will notifying the user's monitoring station that there is an emergency with the user, and send information that may include the time, date, and the user's location as determined by the G.P.S./D.G.P.S. The distress signal may also include identification information of the user, such as a police badge number or other identification. Further, the, distress signal can include identification information for the communication system that may be stored in memory associated with the processor of the wireless adapter. In another embodiment, a dedicated emergency button or switch 732 may be disposed on or be in communication with the switching unit and the G.P.S./D.G.P.S. Once the dedicated emergency button or switch is activated, a distress signal will be sent to the user's monitoring station so that the location of the user can be determined using information from the G.P.S./D.G.P.S. service provider.

A number of implementations have been disclosed herein. Nevertheless, it will be understood that various modifications may be made without departing from the spirit and scope of the claims. Accordingly, other implementations are within the scope of the following claims.

What is claimed:

1. A system comprising:
   a mobile communications device;
   a wireless headset including a speaker and a microphone; and
   a switching unit comprising, separate from and detachably coupled to the mobile communication device through a cabled connection, the switching unit comprising:
      a mobile communications device interface for transmitting signals to and receiving signals from the mobile communications device;
      a wireless adapter for transmitting signals to and receiving signals from the wireless headset; and
      a detection circuit coupled to the wireless adapter, the detection circuit provides a first output signal to the wireless adapter upon detection of a triggering event, the first output signal causes the wireless adapter to enter into an active audio channel mode, and the detection circuit provides a second output signal to the wireless adapter when no triggering event is detected, the second output signal causes the wireless adapter to enter into a standby mode;
      wherein the detection circuit is in connection with the wireless adapter and the mobile communications device interface, the triggering event is a signal created by audio output of the mobile communications device, and the detection circuit sends the first output signal to the wireless adapter when voltage of the signal created by audio output from the mobile communications device is detected by the detection circuit, which places the wireless adapter in the active audio channel mode.

2. The system of claim 1, wherein the detection circuit includes a comparator integrated circuit, the comparator integrated circuit compares the voltage of the signal created by audio output of the mobile communications device to a threshold value, and if the voltage of the signal created by audio output of the mobile communications device is greater than the threshold value, then the detection circuit provides the first output signal to the wireless adapter.

3. The system of claim 1, wherein the wireless adapter is configured to communicate with the wireless headset using the Bluetooth protocol, wherein the wireless headset further can communicate with another communication device without physical modification.

* * * * *